(12) United States Patent
Williams

(10) Patent No.: US 8,414,034 B2
(45) Date of Patent: Apr. 9, 2013

(54) REPLACEMENT FITTING AND METHOD OF INSTALLING SAME

(75) Inventor: Paul T. Williams, East Hartford, CT (US)

(73) Assignee: Turbotec Products, Inc., Windsor, CT (US)

( * ) Notice: Subject to any disclaimer, the term of this patent is extended or adjusted under 35 U.S.C. 154(b) by 366 days.

(21) Appl. No.: 12/763,602

(22) Filed: Apr. 20, 2010

(65) Prior Publication Data

US 2011/0253356 A1    Oct. 20, 2011

(51) Int. Cl.
*F16L 21/00* (2006.01)

(52) U.S. Cl.
USPC ............... 285/419; 285/15; 285/387; 29/456

(58) Field of Classification Search ............ 285/419, 285/15, 373, 249, 387; 29/456
See application file for complete search history.

(56) References Cited

U.S. PATENT DOCUMENTS

| | | | | |
|---|---|---|---|---|
| 625,448 | A | * | 5/1899 | Jaenichen ............... 285/373 |
| 771,709 | A | * | 10/1904 | Carney ................. 285/403 |
| 2,210,340 | A | * | 8/1940 | Reinhardt ............. 285/419 |
| 3,181,896 | A | * | 5/1965 | Russell ................ 285/15 |
| 3,224,796 | A | * | 12/1965 | Burkitt ............... 285/373 |
| 3,382,508 | A | * | 5/1968 | Kammermeyer ........ 285/15 |
| 3,689,110 | A | * | 9/1972 | Ferguson et al. ......... 285/15 |
| 3,934,902 | A | * | 1/1976 | McNamee ............. 285/393 |
| 4,078,470 | A | | 3/1978 | Zeranick, Jr. et al. |
| 4,235,259 | A | | 11/1980 | Hudock |
| 4,236,736 | A | * | 12/1980 | Anderson ............. 285/419 |
| 4,258,944 | A | | 3/1981 | Wendel |
| 4,260,181 | A | * | 4/1981 | Curtin ................ 285/419 |
| 4,343,496 | A | | 8/1982 | Petranto |
| 4,462,731 | A | | 7/1984 | Rovinsky et al. |
| 4,615,477 | A | | 10/1986 | Spada et al. |
| 4,784,412 | A | | 11/1988 | Van Dongen |
| 4,858,968 | A | | 8/1989 | Moebius |
| 4,923,349 | A | * | 5/1990 | Logsdon ............... 285/419 |
| 5,022,684 | A | * | 6/1991 | Eagon ................. 285/179 |
| 5,097,893 | A | * | 3/1992 | Trimble .............. 285/249 |
| 5,098,134 | A | * | 3/1992 | Monckton ............. 285/419 |
| 5,152,556 | A | * | 10/1992 | Holland et al. ........ 285/373 |
| 5,161,835 | A | * | 11/1992 | Miyake ................ 285/15 |
| 6,257,266 | B1 | | 7/2001 | Valdez |

(Continued)

OTHER PUBLICATIONS

C. Matula, Technical Bulletin for Tightening Fittings on Plastic Coils, Turbotec Products, Inc., Dec. 20, 2006, pp. 1-6.

(Continued)

*Primary Examiner* — David E Bochna
(74) *Attorney, Agent, or Firm* — Alix, Yale & Ristas, LLP

(57) ABSTRACT

A replacement fitting assembly for a pipe is disclosed including a split connector with a first wall portion having a first externally threaded portion and a first support portion, and a second wall portion having a second externally threaded portion and a second support portion, the first and second outer wall portions being configured to be aligned with one another to form a tubular opening, and a fastener having a side wall defining a central longitudinal opening, the side wall including an internally threaded nut portion configured to engage the first and second externally threaded portions of the connector, and an extension portion adjacent the nut portion, the side wall having a gap configured to permit lateral entry of a pipe into the longitudinal opening. A method of replacing a fitting assembly also is described.

23 Claims, 4 Drawing Sheets

U.S. PATENT DOCUMENTS

| | | | |
|---|---|---|---|
| 6,270,125 B1 | 8/2001 | Rowley et al. | |
| 6,460,901 B2 | 10/2002 | Rochelle | |
| 6,619,697 B2 * | 9/2003 | Griffioen et al. | 285/15 |
| 6,976,710 B1 | 12/2005 | Bedford | |
| 7,101,457 B1 | 9/2006 | Huffman | |
| 7,172,369 B2 | 2/2007 | Crabtree et al. | |
| 7,296,589 B2 | 11/2007 | Durkee | |
| 7,353,840 B1 | 4/2008 | Deinken et al. | |
| 2009/0057601 A1 | 3/2009 | Crompton | |

OTHER PUBLICATIONS

International Search Report and Written Opinion for PCT/US2011/032407 dated Jul. 27, 2011.

* cited by examiner

REPLACEMENT FITTING AND METHOD OF INSTALLING SAME

BACKGROUND

A number of techniques have been developed for repairing leaks in plumbing systems without requiring removal of adjacent equipment and/or lengths of pipe. U.S. Pat. No. 6,257,266 describes a method for in-line repair of a natural gas pipeline or the like that employs a transition fitting to temporarily seal off the section of pipe to be repaired or replaced, and an expansion tool with an expandable portion that can be inserted through the transition fitting into an upstream pipeline to provide a temporary seal. U.S. Pat. No. 4,615,477 provides a method for repairing a tube that penetrates the wall of a drum or header without having to remove the entire tube. A new portion of tube material is welded to the outside of the header after a tube seat has been created by forming a recess in the outer wall of the header. In U.S. Pat. No. 7,353,840, a split nut is used to fasten a water supply valve assembly having a REHAU® hose barb fitting to an outlet box wall.

It is known to use split connectors in plumbing fittings. U.S. Pat. No. 4,784,412 describes a conduit fitting with a divided tubular threaded connector in which the threads of the two pieces of the connector are aligned using complementary projections and recesses. The fitting is particularly well suited for use in the heating and air conditioning systems of trucks. U.S. Pat. No. 7,172,369 describes the use of a split pipe in conjunction with a thermoplastic liner.

Plastic pipes and pipe fittings frequently are used in heat pumps, including those employed in swimming pool heating and circulation systems. However, the presence of high amounts of chlorine in pool water can cause deterioration of the plastic fittings, resulting in the need for replacement. Removal and substitution of conventional pool fittings often requires removal of the associated equipment, resulting in additional time and expense. It would be useful to provide a method and a system for replacing heat exchanger fittings that permit the associated equipment to remain in place.

SUMMARY

One embodiment disclosed herein is a fitting assembly comprising a split connector comprising a first wall portion having a first externally threaded portion and a first support portion, and a second wall portion having a second externally threaded portion and a second support portion. The first and second wall portions are configured to be aligned with one another to form a tubular opening. The fitting also includes a fastener having a side wall defining a central longitudinal opening, the side wall including an internally threaded nut portion configured to engage the first and second externally threaded portions of the connector, and an extension portion adjacent the nut portion. The side wall has a gap configured to permit lateral entry of a pipe into the longitudinal opening.

Another embodiment is a method of replacing a fitting assembly, comprising removing a first fastener and a first connector from a pipe, and obtaining a second fastener and a second connector. The second fastener has a side wall defining a central longitudinal opening, and includes an internally threaded nut portion. The side wall has a gap configured to laterally receive the pipe. The second connector is a split connector comprising a first wall portion having a first externally threaded portion and a first support portion, and a second wall portion having a second externally threaded portion and a second support portion. The method further comprises placing the second fastener around the pipe and placing the split connector around the pipe adjacent the second fastener, with the externally threaded portions of the two sections aligned, forming a sleeve having first and second seams. The second fastener is threaded onto the split connector, tightened, and secured with the first and second seams of the split connector in contact with the internally threaded nut portion of the fastener side wall.

Other embodiments of fittings and methods also are described herein.

DETAILED DESCRIPTION

The embodiments described herein include a replacement fitting proximate the inlet and/or outlet of plastic jacketed coils for an appliance, such as a heat exchanger, and a method of replacing a worn fitting at or near the inlet or outlet to an appliance that substantially reduces time and expense relative to conventional replacement techniques.

As used herein, a "fastener" is a fastening device suitable for use with piping, including but not limited to a threaded nut. The fastener has a gap or a seam that enables the fastener to be placed around a pipe from the side of the pipe. As used herein, a "split connector" is a tubular segment that can be used to join two pipe ends together and is configured in multiple (usually two) pieces that can be fit around a pipe from the side of the pipe. As used herein an "inlet or outlet tube fitting" is a pipe fitting associated with an inlet line or outlet line for a component such as a heat exchanger, particularly a swimming pool heater.

Figure 1:
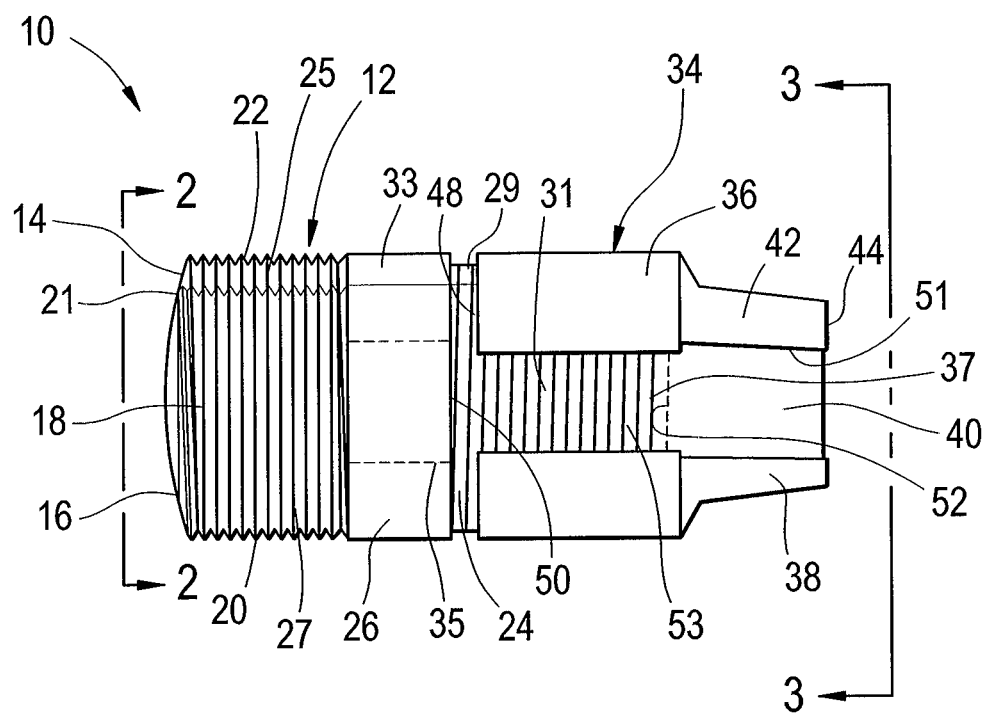
FIG. 1 is a side view of a fitting assembly according to one embodiment.
Figure 2:
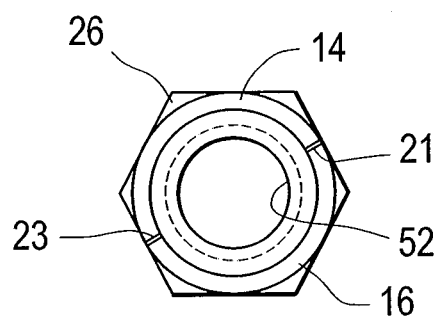
FIG. 2 is an end view of the fitting assembly of FIG. 1, taken along line 2-2 of FIG. 1.
Figure 3:
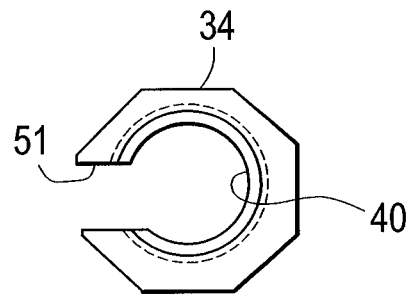
FIG. 3 is an end view of the fitting assembly of FIG. 1, taken along line 3-3 of FIG. 1.

Referring the drawings and first to FIGS. 1-3, a fitting is shown and is designated as 10. The fitting 10 includes a tubular connector 12 formed from first and second connector pieces 14 and 16, respectively. When aligned, the pieces 14 and 16 form a side wall 18 with an outer surface 20. Seams 21, 23 extend along the length of the connector where pieces 14 and 16 touch one another. Preferably, but not necessarily, the first and second pieces 14, 16 of the connector are symmetrical, arcuate longitudinal halves that form a tube with a circular cross section when aligned with one another. Before installation, the two pieces can be separate from one another, as in the embodiment shown in FIGS. 1-3, or can be pivotably attached to one another.

The connector 12 has a first threaded portion 22 at one longitudinal end, including threaded portion 25 of piece 14 and threaded portion 27 of piece 16. The threads can be external and/or internal, and are depicted as external threads in FIGS. 1-3. The connector 12 has a second externally threaded portion 24 at another longitudinal end, including threaded portion 29 on piece 14 and threaded portion 31 on piece 16. The connector also includes and an intermediate gripping support portion 26 formed by the portion 33 of piece 14 and portion 35 of piece 16. The gripping support portion 26 is configured to be gripped by a tool during fastening and unfastening of the fitting 10. In the embodiment of FIGS. 1-3, the gripping support portion 26 has a nut-shaped hexagonal cross section. The first threaded portion 22 is configured for engagement with an appliance component. In the embodiment shown in FIG. 1, the first threaded portion is configured for engagement with an internally threaded opening 28, such as, but not limited to, an opening in a wall 30 of an appliance housing 32, shown in FIG. 4. The second externally threaded portion 24 is configured for attachment to a fastener 34. The precise construction and shape of the connector can vary provided that it is threaded on at least a portion of its external surface, and has a section configured for gripping by a tool. In one embodiment, the connector 12 comprises polymeric material, such as polyvinyl chloride.

The connector pieces 14, 16 are held together by a fastener 34. The fastener 34 includes a nut portion 36 and a connecting portion 38 extending coaxially therefrom. The nut portion 36 has a threaded inner wall 37 configured for threadable engagement with the second externally threaded portion 24 of the connector 12. After attachment of the fastener 34, the terminal end 48 of the nut portion 36 of the fastener 34 abuts or is proximate an exterior shoulder 50 formed at the connection of the intermediate gripping support portion 26 and the second externally threaded portion 24 of the connector 12. The fastener 34 has a C-shaped cross section, as is shown in FIG. 3, and a longitudinal gap 51 formed along both the nut portion 36 and the connecting portion 38 that allows the fastener to be mounted on a pipe from the side of the pipe. The width of the gap 51 after installation depends upon both the diameter of the pipe around which it is to be mounted and the elasticity of the material used to form the fastener 34. As is shown in FIGS. 1 and 3, the width of the gap is smaller than the outer diameter of the externally threaded portion 24 of the connector 12. The fastener has an interior shoulder 52 forming a notch that abuts the terminal end 53 of the second externally threaded portion 24 of the connector 12 when the nut is completely fastened. The shoulder 52 helps to hold the connector 12 in place in order that the seams between the connector pieces stay in contact with the inner wall 37 of the nut portion 36 of the fastener 34. In one embodiment, the connector comprises polymeric material, such as polyvinyl chloride.

In the embodiment shown in FIGS. 1-3, the connecting portion 38 of the fastener 34 has a smooth inner wall 40 and a smooth outer wall 42 and is tapered with a smaller diameter at the terminal end 44 than at the end connected to the nut portion 36. The connecting portion 38 of the fastener 34 is configured to surround the pipe on which the fitting is mounted and to abut a lokring joint 96, (shown in FIGS. 4-12).

Figure 4:
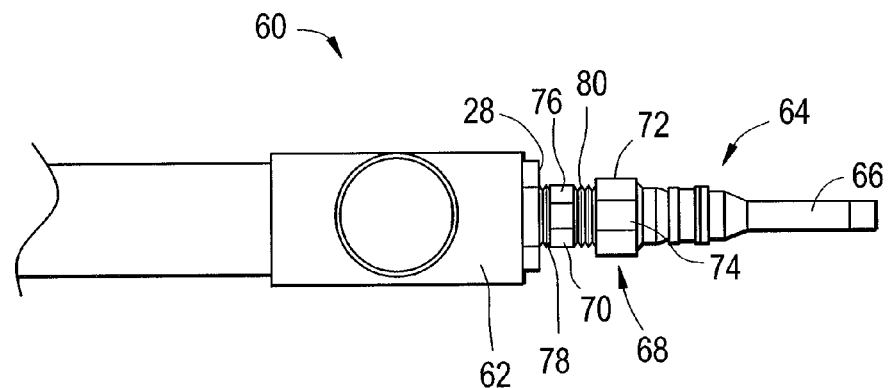
FIGS. 4-12 schematically illustrate replacement of a fitting assembly.

A fitting having the configuration shown in FIGS. 1-3 can used to repair an appliance inlet using the method that is depicted in FIGS. 4-12. More particularly, the appliance assembly 60, shown in FIG. 4-6, includes an appliance 62 with an inlet assembly 64. The inlet assembly 64 includes an inlet tube 66 and an existing fitting assembly 68. The existing fitting assembly 68 may have a conventional construction, including a one-piece connector and a fastener that does not have a gap or seam, as is shown in FIG. 4. More particularly, the fitting 68 includes a connector 70 and a fastener 72. First, the existing fitting assembly 68 is removed. The fastener 72 is loosened from the connector 70 by turning the nut portion 74 of the fastener while holding the hex portion 76 of the connector 70 in place. When loosening begins, a first threaded end 78 of the connector 70 is still connected to the appliance 62 and the other threaded end 80 is connected to the fastener 72.

Figure 5:
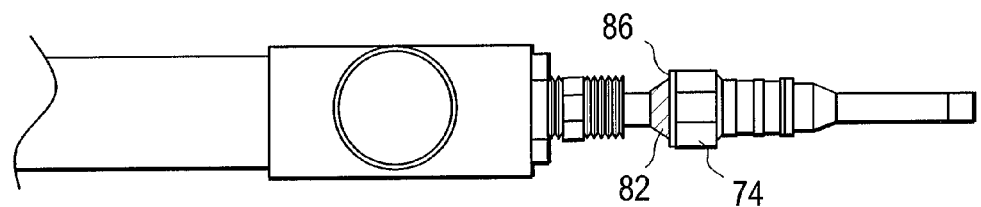
Figure 6:
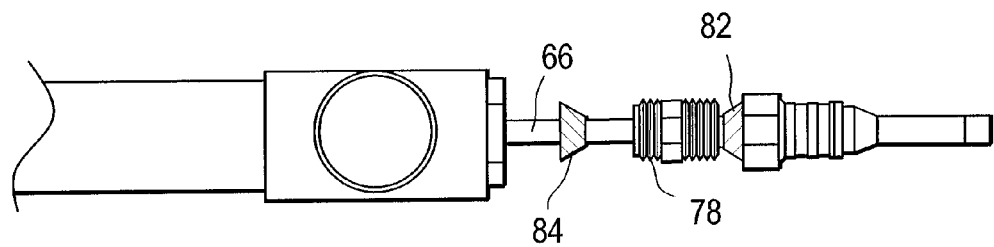

After the nut portion 74 of the fastener 72 is sufficiently loose to separate the fastener 72 from the connector 70, as shown in FIG. 5, the elastomeric ferrule 82 that functions as a gasket, and a ring 86, which reduces friction of plastic on plastic when tightening the nut, are slid away from the connector 70 along the tube 66. The connector 70 is then loosened from the appliance 62 by turning the hex portion 76 of the connector 70. After the fastener 72 and connector 70 have been loosened, the tube 66 is capable of being moved in and out of the appliance 62 by a length of about 1 inch, as depicted in FIG. 6. At this point, a second sealing cone 84, which functions as a gasket, is visible. The connector 70, fastener 72, ferrule 82, cone 84 and ring 86 also are cut away.

Figure 7:
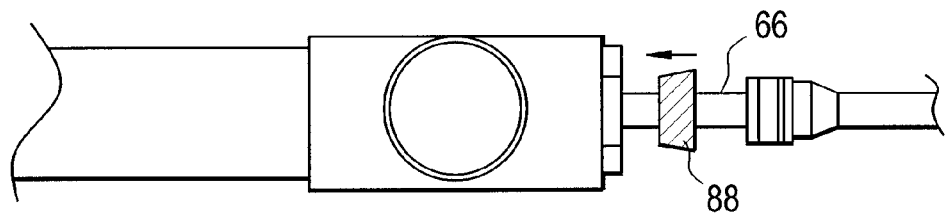

The cone 84 is replaced with a tapered, flexible polymeric ring 88 with a slit in its side wall that enables it to be placed around the tube 66. The ring 88 is installed by slipping it onto the tube of the heat exchanger with the smaller diameter end towards the appliance 62 as is shown in FIG. 7. A small amount of adhesive is placed in the slit of the ring 88, and ring material on the two sides of the slit is pushed together. After the adhesive is dry, the ring 88 is slid toward the female threaded cavity 89 of the appliance 62. The ring 88 is pushed into place until it seats in the cavity 89 of the appliance 62.

Figure 8:
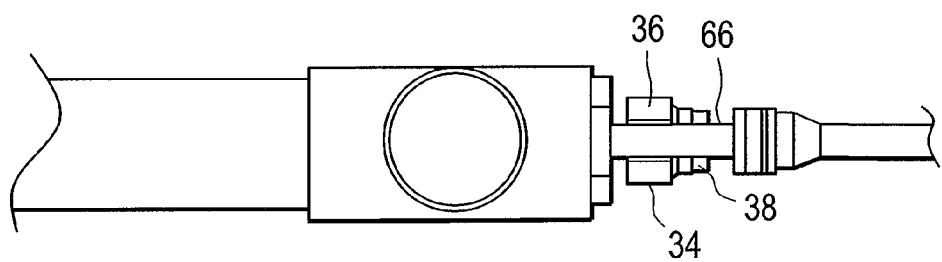
Figure 9:
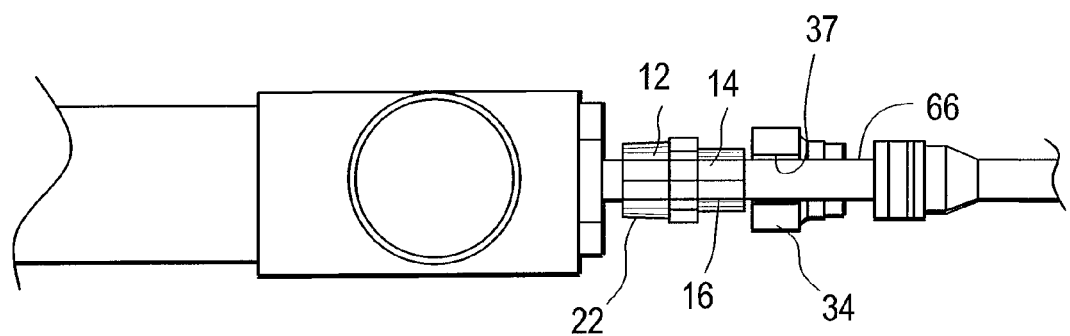
Figure 10:
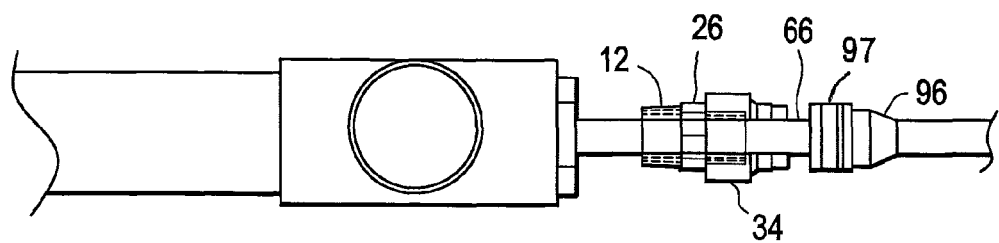

Next, a replacement fastener 34 is snapped into place on the tube 66, with the nut portion 36 closer to the appliance than the connecting portion 38, as is shown in FIG. 8. The first and second pieces 14, 16 of the connector 12 are then placed on the tube 66 as if they were one piece, with the first threaded portion 22 being closer to the appliance than the opposite end, as is shown in FIG. 9. The connector 12 is manually held with the threads of the two halves 14, 16 aligned, and the fastener 34 is threaded onto the connector 12, until it looks as is shown in FIG. 10, i.e. with the fastener 34 abutting the gripping support portion 26 of the connector 12. The nut portion 36 of the fastener 34 is threaded onto the connector 12 in a configuration such that the seams 21, 23 of the connector are positioned along the inner wall 37 (shown in FIG. 1) of the nut portion 36 when the connection is tight, i.e. the seams 25, 27 are not positioned in the gap 50. This configuration ensures that the connector 12 will stay in place when tightening the gripping support portion 26. The threads on the inner wall 37 will help keep the split bushing in place when the seam is not positioned within the gap. The correct alignment of the fastener 34 relative to the connector pieces 14, 16 is shown in FIG. 10. A few drops of adhesive are placed in each end of the notched surfaces 92, 94 of fastener 34 on each side of the gap 50, as is shown in FIG. 11.

Figure 11:
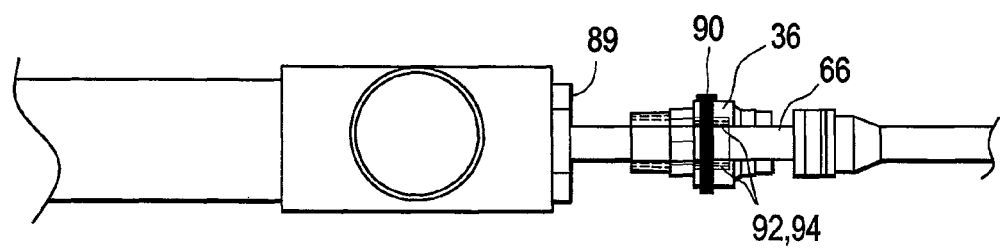
Figure 12:
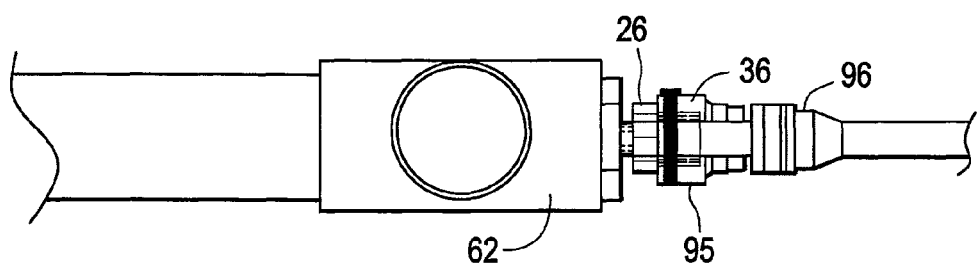

A zip tie 90, shown in FIG. 11, is placed around the nut portion 36 of the connector 38 and is tightened until it holds the nut portion 36 in place. The zip tie 90 functions as a clamp. A tight seal is formed because the sides of the fastener wall in the area of the cap 50 are pulled together.

Pliers are used to tighten the connector 12 in the threaded cavity 89 of the appliance 62 by rotating the gripping support portion 26 of the connector 12. When the connector is tight, lokring joint 96, which including lokring 97, abuts or nearly abuts the fitting. The assembly that includes the connector 12, fastener 34 and zip tie 90, mounted to the appliance 62, has the configuration shown in FIG. 12. The fitting is then tested for leaks. If any leaks are present, the gripping support portion 26 of the connector 12 is tightened until the leaks stop.

The embodiments described herein are particularly useful when employed with a tube-in-tube heat exchanger having an inlet or outlet connection that has been eroded by chlorinated water.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A fitting assembly, comprising:
   a split connector comprising a first wall portion having a first externally threaded portion and a first support portion, and a second wall portion having a second externally threaded portion and a second support portion, the first and second wall portions being configured to be aligned with one another to form a tubular portion with a first outer diameter, and
   a one-piece fastener having a length and a side wall defining a central longitudinal opening, the side wall including an internally threaded nut portion configured to engage the first and second externally threaded portions of the connector, and an extension portion adjacent the nut portion, the fastener having a C-shaped cross section defining a gap extending along the length of the fastener and being configured to permit lateral entry of a pipe into the longitudinal opening, the gap having a width that is smaller than the outer diameter of the tubular portion of the split connector.

2. The fitting assembly of claim 1, wherein the first wall portion of the connector includes a threaded third wall portion and the second wall portion includes a threaded fourth wall portion, the third and fourth wall portions being configured to be aligned with one another and to engage an appliance component when installed.

3. The fitting assembly of claim 2, wherein the threaded third and fourth wall portions are externally threaded and are configured to threadably engage a wall of the appliance when installed.

4. The fitting assembly of claim 2, wherein, when the first and second wall portions of the connector are aligned with one another to form a tubular opening, and the outer diameter of the first and second wall portions is smaller than the outer diameter of the third and fourth wall portions.

5. The fitting assembly of claim 2, further comprising a gasket configured to be mounted between the appliance component and the connector.

6. The fitting assembly of claim 5, wherein the gasket has a wall having a single slit therethrough.

7. The fitting assembly of claim 1, wherein the connector has an outer shoulder configured to abut the nut portion of the fastener.

8. The fitting assembly of claim 1, wherein the extension portion of the fastener has a smaller inner diameter than the internally threaded nut portion, forming an inner shoulder.

9. The fitting assembly of claim 8, wherein the inner shoulder abuts terminal ends of the first and second externally threaded portions of the connector.

10. The fitting assembly of claim 8, wherein the extension portion of the fastener has a tapered external wall.

11. The fitting assembly of claim 1, wherein the fastener and split connector comprise polymeric material.

12. The fitting assembly of claim 1, wherein the split connector comprises two longitudinally divided, equally sized halves.

13. The fitting assembly of claim 1, further comprising a clamp configured to be disposed around the nut portion of the fastener.

14. A heat exchanger assembly comprising at least one of an inlet tube and an outlet tube including the fitting assembly of claim 1.

15. The heat exchanger assembly of claim 14, wherein the first wall portion of the connector includes an externally threaded third wall portion and the second wall portion includes an externally threaded fourth wall portion, the third and fourth wall portions being aligned with one another and engaging the heat exchanger wall when installed.

16. The heat exchanger assembly of claim 14, wherein the extension portion of the fastener is proximate a non-threaded connector.

17. The heat exchanger assembly of claim 14, wherein the fastener and connector comprise polymeric material.

18. A method of replacing a fitting assembly, comprising:
   removing a first fastener and a first connector from a pipe, the pipe having a first diameter,
   obtaining a second, one-piece fastener having a length and a second connector having a first outer diameter, the second fastener having a side wall defining a central longitudinal opening and including an internally threaded nut portion, the fastener having a C-shaped cross section defining a gap extending along the length of the fastener, the gap having a width that is smaller than the outer diameter of the tubular portion of the connector and is wider that the diameter of the pipe, the second connector being a split connector comprising a first wall portion having a first externally threaded portion and a first support portion, and a second wall portion having a second externally threaded portion and a second support portion,
   placing the second fastener around the pipe,
   placing the split connector around the pipe adjacent the second fastener, with the externally threaded portions of the two sections aligned, forming a sleeve having first and second seams,
   threading the second fastener onto the split connector,
   tightening the second fastener, and
   securing the second fastener with the first and second seams of the split connector in contact with the internally threaded nut portion of the fastener side wall.

19. The method of claim 18, wherein the second connector further includes externally threaded third and fourth outer wall portions, further comprising threadably engaging the third and fourth outer wall portions with an appliance.

20. The method of claim 18, wherein the second fastener is a notched nut with an inner shoulder, and wherein the second fastener is tightened until the inner shoulder abuts the milt connector.

21. The method of claim 18, wherein the second fastener comprises a nut portion and an extension portion and the extension portion is proximate a non-threaded connector.

22. The method of claim 18, further comprising disposing a clamp around the second fastener.

23. The method of claim 22, wherein the clamp is tightened in an amount sufficient to reduce the width of the gap of the second fastener.

* * * * *

UNITED STATES PATENT AND TRADEMARK OFFICE
CERTIFICATE OF CORRECTION

PATENT NO. : 8,414,034 B2  
APPLICATION NO. : 12/763602  
DATED : April 9, 2013  
INVENTOR(S) : Paul T. Williams Page 1 of 1

It is certified that error appears in the above-identified patent and that said Letters Patent is hereby corrected as shown below:

In the Claims

Claim 20, column 6, line 51, delete "milt" and insert --split--.

Signed and Sealed this  
Fifth Day of November, 2013

Teresa Stanek Rea  
*Deputy Director of the United States Patent and Trademark Office*